Patented May 2, 1950

2,506,320

UNITED STATES PATENT OFFICE 2,506,320

METHOD OF PREPARING SOLUTIONS OF MIXTURES OF SILOXANE RESIN AND POLYVINYL ACETAL RESIN, WHEREIN CRESYLIC ACID IS USED AS ONE OF THE SOLVENTS

John H. Vail, Muskegon, Mich., assignor to Anaconda Wire and Cable Company, a corporation of Delaware No Drawing. Application December 6, 1945, Serial No. 633,273

5 Claims. (Cl. 260—33.4)

This invention relates to the production of homogeneously mixed silicone and polyvinyl-acetal resins. More particularly, the invention is concerned with the preparation of homogeneous solutions of these two types of resins, and with utilization of the homogeneous mixture for the insulation of electric wires.

For several years silicone-resin preparations have been available commercially in the form of solutions containing partially polymerized silicone compounds. These solutions have been used with some success as varnishes or enamels for the electrical insulation of magnet wires and other electrical conductors. For such purpose, the silicone solution commonly is applied to a wire in conventional wire-enamelling apparatus, and the solution-coated wire is passed through an oven in which it is baked at a high enough temperature to drive off the solvent and cause polymerization of the silicone to the desired extent, with consequent formation of a hardened silicone-resin film about the wire. Silicone-resin films thus prepared will withstand much higher temperatures without decomposing than other commercially satisfactory insulating resins. However, they suffer from the drawback that they are not very resistant to abrasion. Wires coated with heat-hardened silicones therefore have not heretofore been very successful in withstanding the handling to which they must be subjected in winding coils, forcing coils into motor slots, and other manufacturing operations.

Solutions containing polyvinyl-acetal compounds in unpolymerized or only partially polymerized form have also been available for a number of years. Often the polyvinyl-acetal compound is modified in these solutions by the addition of incompletely polymerized phenolic resins. Even more commonly than the silicone solutions, these polyvinyl-acetal solutions are applied as an insulating enamel coating to wires and are heat-hardened on the wires by baking in an oven. The heat-hardened insulating films produced from these polyvinyl-acetal solutions have good electrical insulating qualities and are highly resistant to abrasion, so that wires coated with them may readily be handled for manufacturing purposes without injuring the coating. Coating of this type, however, will not withstand prolonged exposure to even moderately high temperatures, and therefore cannot be used in electrical apparatus designed for operating at such temperatures.

Silicone-resin solutions and polyvinyl-acetal resin solutions as heretofore known are not compatible with one another. Upon mixing these solutions, a jelly-like precipitate promptly forms. This jelly cannot successfully be applied as a smooth coating to a wire or any other object because of its very thick and lumpy consistency, and there is no satisfactory method for thinning or redissolving the jelly once it has been formed.

I have discovered that smooth, homogeneous and stable solutions of mixed silicone resins and polyvinyl-acetal resins may be prepared by procuring separate solutions of each resin in a solvent miscible with cresylic acid, and by adding to one of these solutions an amount of cresylic acid which is sufficient to bring the total quantity thereof in both solutions to at least 15 per cent by volume of the combined volume of both solutions, and to at least 40 per cent by volume of the polyvinyl-acetal resin solution. After this cresylic acid addition, the two solutions may be mixed easily with the formation of a smooth, homogeneous and stable solution containing both resins.

The resulting solution may be applied to wires in conventional enamelling apparatus and may be heat-hardened in a baking oven at a temperature upwards of about 450° C. The insulated wire thus produced has a smooth, homogeneous, hard film composed of a mixture of silicone resin and polyvinyl-acetal resin, which is resistant to decomposition at temperatures much higher than polyvinyl-acetal resins alone can withstand and which possesses abrasion resistance greatly in excess of that of silicone-resin films alone.

The silicone-resin solutions with which my invention is concerned ordinarily are solutions in xylol, toluol, cresol, coal-tar naphtha, or other volatile organic solvent, of an intermediate condensation (partially polymerized) product of an organic-substituted silicon hydroxide. Although these compounds are referred to in the trade as "silicones," they are more aptly called "siloxanes" and are so referred to in the claims. For example, the methyl silicones described in the Rochow Patent No. 2,258,218, dated October 7, 1941, are of this character, and such silicones (i. e. hydrocarbon-substituted siloxanes) in volatile solvents have been used for enamelling wires. Xylol and toluol are typical solvents for preparing these silicone solutions, and are extensively used for this purpose. They are readily miscible with cresylic acid.

The polyvinyl-acetal solutions contemplated by the invention are solutions in volatile organic solvents, such as cresylic acid, coal-tar naphtha, etc., of intermediate polymers of a vinyl aldehyde, usually a lower aliphatic aldehyde, such as formaldehyde or acetaldehyde. Often the polyvinyl-acetal in solution is modified by inclusion in the solution of a partially poylmerized phenolic resin. A solution of this latter character, consisting essentially of a polyvinyl-acetal resin modified by the addition of a phenolic resin and dissolved in a solvent composed largely of cresylic acid, has been widely used for some years as a wire enamel for insulating magnet wires.

The cresylic acid which I employ in preparing homogeneous, stable solutions from these normally incompatible solutions is advantageously the commercial product consisting primarily of a mixture of ortho-, meta-, and para-cresols, but the essentially pure cresols may be used equally well.

Stable homogeneous solutions containing any desired proportions of silicone resin and polyvinyl-acetal resin may be prepared by my method. In preparing these mixed solutions, volumes of the silicone solution and of the polyvinyl-acetal solution may be measured out in quantities corresponding to the proportions desired in the mixed solution. An amount of cresylic acid equal to at least about 15 per cent by volume of the combined volumes of the two solutions, and sufficient to bring the total amount of cresylic acid in both solutions to at least 40 per cent by volume of the amount of polyvinyl-acetal resin solution employed, then is added to and mixed with either of the two solutions. Greater amounts of cresylic acid may be employed if desired. Thereafter, the two solutions may be mixed readily and will form a stable homogeneous solution. After preparation, this solution may be diluted with coal-tar naphtha, toluol, more cresylic acid, or other compatible diluent to produce a diluted solution of whatever viscosity and resin content is desired.

While the polyvinyl-acetal resin solution, described above, normally contains between 25 and 30 per cent cresylic acid, this amount of cresylic acid is insufficient to render even very small amounts of silicone-resin solution compatible therewith. Even very small additions of the silicone-resin solution to a large volume of this resin solution promptly causes precipitation of the jelly-like substance. But if, in accordance with this invention, a further addition of cresylic acid equal to at least 15 per cent by volume of the combined volume of the two initial solutions, and sufficient together with the cresylic acid already present in the polyvinyl-acetal resin solution to bring the total amount thereof to at least about 40 per cent by volume of said resin solution, is made either to the polyvinyl-acetal resin solution or to the silicone solution, the two solutions may then be mixed readily and will form a homogeneous stable solution.

The following are typical examples of the preparation of stable solutions of the mixed resins in accordance with the invention:

Example I

Five parts by volume of a polyvinyl-acetal resin which contained about 26 volume per cent of cresylic acid as solvent was measured out and 16 volume parts of commercial cresylic was added to and mixed with this solution. Ninety-five volume parts of a silicone-resin solution in xylene and toluene as solvents was then added to the first solution and mixed therewith. A stable homogeneous solution of fairly low viscosity resulted. The mixed solution was suitable for coating magnet wires by the conventional enameling method, involving dipping the wire in the solution and then passing the wire through a baking oven. An oven temperature of about 450° C., with the wire passing through the oven at the usual commercial rate of speed (for example, about one minute exposure of the wire in the oven in the case of a number 30 B. & S. gauge copper wire) suffices to form a hard, smooth insulating film of the mixed resins on the wire. A number of coats of the solution may be applied, as is common practice in wire-enamelling operations, by again passing the wire through the solution and oven after the preceding coat has been baked. The heat-hardened coating on the wire is tough and very resistant to abrasion, and will withstand considerably higher temperatures without charring or decomposing than will unmodified polyvinyl-acetal resin coatings.

Example II

Twenty volume parts of commercial cresylic acid were added to 50 volume parts of a silicone-resin solution in xylene and toluene. To the resulting solution there were added 50 volume parts of a polyvinyl-acetal resin modified by the addition of phenolic resin in a solvent containing about 25 volume per cent cresylic acid. Upon stirring, the mixed solutions formed a single, stable, homogeneous solution containing roughly equal parts by weight of silicone resin and polyvinyl-acetal resin. The resulting solution was quite viscous, but it could be thinned to suitable wire coating viscosity by the addition of any of the conventional diluents for this purpose, such as coal-tar naphtha, toluene, or more cresylic acid. The thinned solution was suitable for coating on a wire and being heat-hardened as in the foregoing example, except that in this case an oven temperature of about 500° C. was most suitable. The wire having a heat-hardened insulating film produced from this composition was highly resistant to abrasion, and was much more resistant to thermal decomposition than wires coated only with polyvinyl-acetal resin modified by the addition of phenolic resin.

Example III

About 15 volume parts of commercial cresylic acid was added to 95 volume parts of the polyvinyl-acetal resin solution used in Example II. About 5 volume parts of the silicone-resin solution in xylene and toluene was then added to and mixed with the solution of polyvinyl-acetal resin and cresylic acid. A stable homogeneous mixed-resin solution of quite high viscosity resulted. The resulting solution was capable of being applied to a wire by the die method of enamelling, involving drawing the wire through a pool of the viscous solution, then through a die for removing excess solution from the wire, and then through the baking oven. An oven temperature of about 550° C. was most suitable for baking. Any desired number of coats of the solution could be applied. The heat-hardened mixed resin coating produced on a wire by use of this composition was highly resistant to thermal decomposition and quite resistant to abrasion (notwithstanding the rather low percentage of polyvinyl-acetal resin in the composition). The abrasion resistance per mil of coating thickness was approximately six times greater than in the case of wires coated with unmodified silicone-resin solutions.

So far as I have been able to determine, mixed-resin solutions prepared in accordance with the invention are completely homogeneous. Also they appear to be perfectly stable and may be stored for many months with no evident deterioration.

Heat-hardened coatings formed on wires from these mixed solutions also are completely homogeneous so far as can be determined, and are perfectly stable under all ordinary conditions. When properly baked, they are nontacky, tough, flexible and abrasion-resistant, and possess notable resistance to decomposition at temperatures substantially higher than unmodified polyvinylacetal resins, or such resins modified with phenolic resins, can withstand.

I claim:

1. The method of producing a homogeneous solution of a mixture of solutions of a hydrocarbon-substituted siloxane resin and a polyvinyl-acetal resin consisting of a polyvinyl alcohol-lower aliphatic aldehyde condensation product which comprises procuring separate solutions of each resin in a solvent miscible with cresylic acid, adding to at least one of said resin solutions an amount of cresylic acid which is sufficient to bring the total quanity thereof in both solutions to at least 15% by volume of the combined volume of both resin solutions and to at least 40% by volume of the polyvinyl-acetal resin solution, and thereafter mixing the two resin solutions.

2. The method of producing a homogeneous solution of a mixture of solutions of a hydrocarbon-substituted siloxane resin and a polyvinyl-acetal resin consisting of a polyvinyl alcohol-lower aliphatic aldehyde condensation product which comprises procuring a solution of the silicone resin in a solvent miscible with cresylic acid, procuring a solution of the polyvinyl-acetal resin in a solvent comprising cresylic acid, incorporating in one of said resin solutions a further amount of cresylic acid sufficient to bring the total quantity thereof in both solutions to at least 15% by volume of the combined volume of both resin solutions and to at least 40% by volume of the polyvinyl-acetal resin solution, and thereafter mixing the two resin solutions.

3. The method of producing a homogeneous solution of a mixture of solutions of a methylsiloxane resin and a resin consisting of a polyvinyl alcohol-lower aliphatic aldehyde condensation product which comprises procuring separate solutions of each resin in a solvent miscible with cresylic acid, adding to at least one of said resin solutions an amount of cresylic acid which is sufficient to bring the total quantity thereof in both solutions to at least 15% by volume of the combined volume of both resin solutions and to at least 40% by volume of said resin solution, and thereafter mixing the two resin solutions.

4. The method of rendering miscible normally immiscible solutions of a hydrocarbon-substituted siloxane resin and of a polyvinyl-acetal resin consisting of a polyvinyl alcohol-lower aliphatic aldehyde condensation product, both of said solutions being in solvents miscible with cresylic acid, which comprises diluting at least one of said resin solutions with an amount of cresylic acid equal to at least 15% by volume of the combined volume of the two solutions and to at least 40% by volume of the polyvinyl-acetal resin solution.

5. A stable homogeneous solution comprising a mixture of a solution of a hydrocarbon-substituted siloxane resin and a solution of a polyvinyl-acetal resin consisting of a polyvinyl alcohol-lower aliphatic aldehyde condensation product, each of said resins being in solution in a solvent miscible with cresylic acid, the mixture further containing cresylic acid in amount of at least 15% by volume of the combined volume of both resin solutions and to at least 40% by volume of the polyvinyl-acetal resin solution.

JOHN H. VAIL.

REFERENCES CITED

The following references are of record in the file of this patent:

UNITED STATES PATENTS

| Number | Name | Date |
| --- | --- | --- |
| 2,215,996 | Benton | Sept. 24, 1940 |
| 2,258,218 | Rochow | Oct. 7, 1941 |
| 2,286,759 | Patnode | June 16, 1942 |
| 2,317,891 | Dennison | Oct. 27, 1943 |
| 2,389,491 | Dunlap et al. | Nov. 20, 1945 |